INVENTORS
DAVID J. KINSLEY
GEORGE A. BIERNSON
BY
Stanley M. Schurgin
ATTORNEY

INVENTORS
DAVID J. KINSLEY
GEORGE A. BIERNSON
BY
Stanley M. Schwarz
ATTORNEY

Patented Sept. 2, 1969

3,465,094

TELEVISION CAMERA DYNAMIC COMPENSATION APPARATUS FOR CONTROLLING THE EFFECT OF LIGHT VARIATIONS WITHIN A SCENE

George A. Biernson, Concord, and David J. Kinsley, Winthrop, Mass., assignors to Sylvania Electric Products, Inc., a corporation of Delaware
Filed Sept. 28, 1966, Ser. No. 582,739
Int. Cl. H04n 5/38, 5/44
U.S. Cl. 178—5.4 6 Claims

ABSTRACT OF THE DISCLOSURE

A television camera dynamic compensation apparatus for controlling the effect of light variations within a scene by employing focused and control television cameras directed at the same scene and scanned in synchronism. The control camera receives a spatially smoothed image of the scene and produces a signal to control instantaneously the output signal of the focused television camera on a point-by-point basis within the scene.

This invention relates to gain control systems and more particularly to a system which automatically controls the gain of a television camera as a function of the lighting conditions within a scene.

Television cameras generally employ automatic gain control circuitry which allows the system to adapt to the general lighting conditions of a scene. The gain of the camera varies inversely as the average light power received from the scene; when the average light power is low, the gain of the camera is increased and when the the average light power is high, the gain is decreased. These automatic gain controls are effective when the scene illumination is reasonably uniform, but if there are wide variations of lighting across the scene, a poor image results because the automatic gain control, which takes a time average of the light power per scan cannot compensate for the difference in lighting within the scene.

It has been discovered that automatic gain control for a television camera can be achieved by means of a control signal representing a spatially smoothed image of the scene being viewed, in which the high spatial frequency content is attenuated, and this spatially smoothed image can be derived from a suitably altered image of the same scene. This control signal is used to adjust instantaneously the gain of the television camera.

A gain controlled television camera system embodying the invention comprises focused and control television cameras directed at the same scene and scaned in synchronism, where the focused camera receives a focused image and the control camera receives a spatially smoothed image of the same scene. The signal from the control camera provides the required signal to control instantaneously the gain of the focused camera.

This invention will be more fully understood from the following detailed description, taken in conjunction with the accompanying drawings, wherein.

Figure 1:
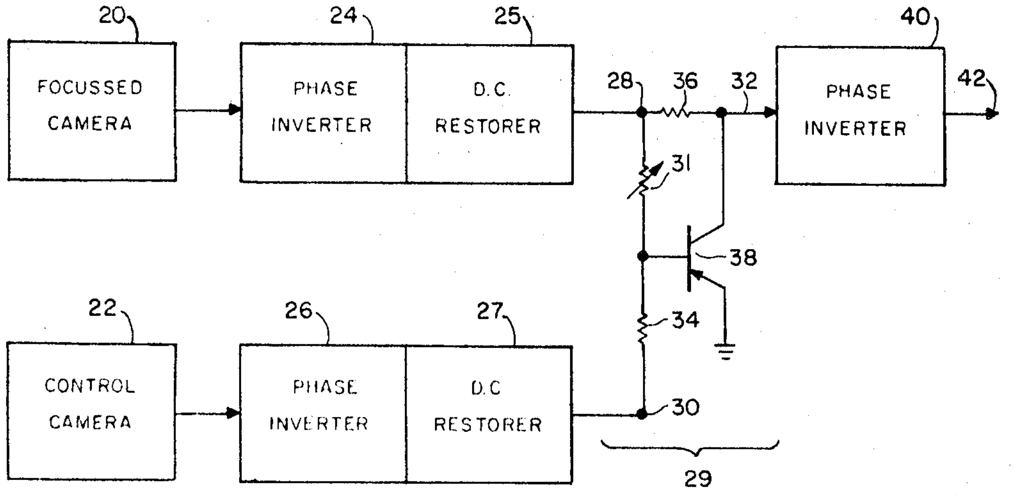
FIG. 1 is a schematic diagram of a gain control system according to the invention.

A gain control system embodying the invention is shown in FIG. 1 and includes a focused television camera 20, such as a vidicon camera, and a control television camera 22, scanned in synchronism with camera 20, each being connected to a respective phase inverter 24 and 26 and respective direct-current restorer circuits 25 and 27. The outputs of circuits 25 and 27 and applied to a gain control circuit 29, whose output, after phase inversion in inverter 40, is the compensated video signal. The phase inverter circuits 24 and 26 transpose the positive voltages from the cameras to the negative polarity required by control circuit 29, and the direct-current restorer circuits 25 and 27 clamp and pedestal voltages of the camera to an absolute voltage level, such as ground.

Control circuit 29 includes a variable resistor 31 in series with a resistor 34, one end of resistor 31 being connected to the output of circuit 25 via terminal 28, and one end of resistor 34 being connected via terminal 30 to the output of circuit 27. The junction of resistors 31 and 34 is connected to the base of a transistor 38, the emitter of which is connected to ground and the collector of which is connected via a resistor 36 to terminal 28 and also to the input of a phase inverter circuit 40. The output of the phase inverter is the compensated output video signal.

Control circuit 29 is operative to solve the equation $V=F/(C+KF)$, where F and C are the video signals from the focused and control cameras, respectively, V is the compensated video output signal, and K is a positive constant of the order of unity. The voltages at terminals 28 and 30 inversions of the focused camera signals and the control camera signals, respectively; thus, a voltage —F exists at terminal 28, while a voltage —C exists at terminal 30. The base current of transistor 38 is made proportional to $-(C+KF)$ by the voltage divider action of resistors 31 and 34 and the energizing signals. The value of K, which should be near unity, is controlled by adjusting the relative values of resistors 31 and 34, for example, by suitably adjusting the resistance of variable resistor 31.

Transistor 38 is operated in the region of small collector voltage which results in its saturation resistance ($R_S$) being inversely proportional to the base current $I_b$. Resistor 36 is large with respect to the saturation resistance of transistor 38, and the collector voltage at terminal 32 is, therefore, proportional to the voltage at terminal 28 multiplied by the saturation resistance $R_s$. Stated mathematically $V_{32}=K_1R_sV_{28}$, where $K_1$ is a proportionality constant, $V_{32}$ is the voltage at terminal 32 and $V_{28}$ is the voltage at terminal 28.

Since $R_s$ is inversely proportional to the negative of the base current $I_b$ of transistor 38, then $V_{32}$ is also equal to $K_2V_{28}/(-I_b)$, where $K_2$ is a constant. As stated previously, the voltage it terminal 28 is proportional to —F, and the base current $-I_b$ is proportional to $$-F/(C+KF)$$

and, by substitution, it is evident that the voltage at terminal 32 is equal to $K_3(-F)/(C+KF)$, which is the desired result, where $K_3$ is a constant. Since the output voltage at terminal 32 is negative and television receivers require a positive voltage, a phase inverter 40 is provided to transpose the signal polarity at the output 42.

The spatially smoothed image of camera 22 can be achieved by designing the optics so that the light from each point in the scene is spread over an area of the photosensitive surface rather than being focused at a point, or, alternatively the image from the scene can be focused on the photosensitive surface and the electron beam used for readout can be defocused so that at any instant it reads out the information over an area of the photosensitive surface. When the image is smoothed optically, ideal smoothing is achieved by causing the light from each point to be spread into a pattern on a photosensitive surface having the form of a zeroth order modified Hankel function of distance from the center of the pattern. This pattern has a maximum at its center and decreases continuously and monotonically with distance from the center. When the smoothing is achieved by defocusing the electronic readout beam, the electron optics should ideally be designed so that the collection efficiency of the beam varies proportionally to a modified zeroth order Hankel function of distance from the center of the beam.

Figure 2:
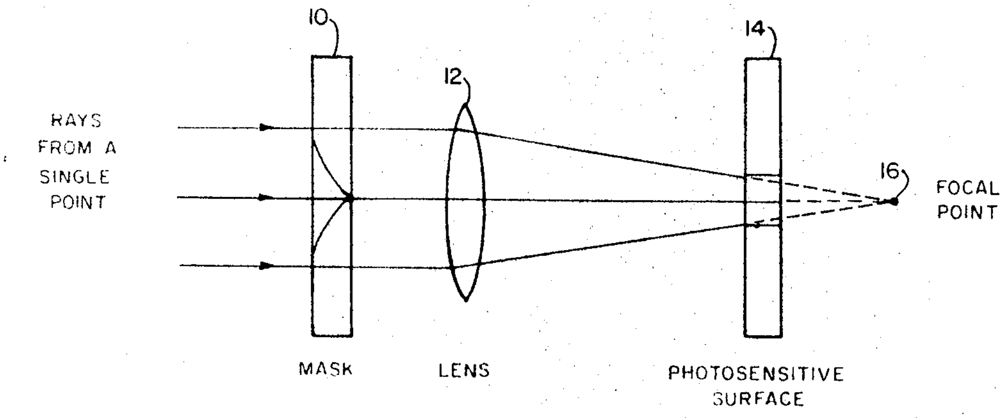
FIG. 2 is a schematic diagram of an optical image smoothing technique useful in the present invention.
Figure 3A:
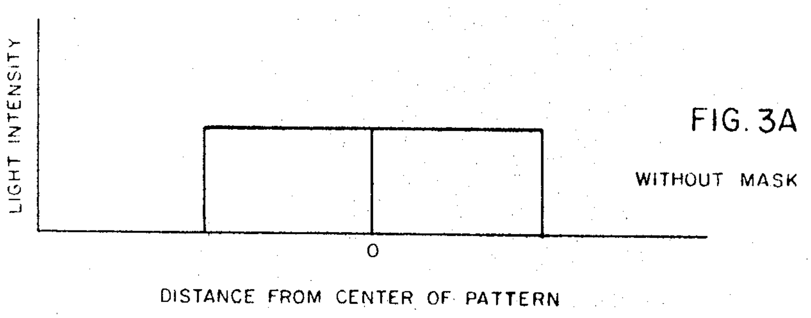
FIGS. 3A and 3B are curves of intensity patterns on the photosensitive surface of a television camera tube useful in describing the invention.
Figure 3B:
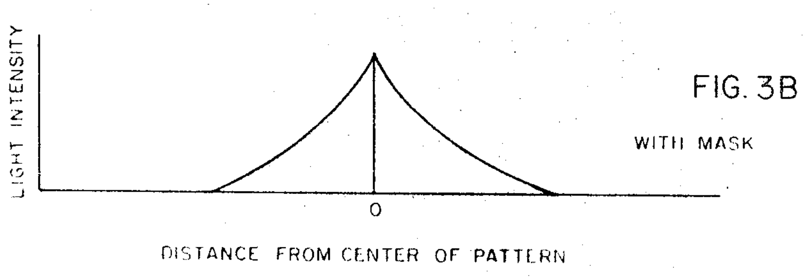

FIG. 2 shows a means of producing on the photosensitive surface 14 of the control television camera the required spatially smoothed image, by means of light optics, which includes a lens 12 and mask 10. Light rays from a distant point in the scene being viewed are focused by lens 12 toward the focal point 16 situated behind, or in front of, the photosensitive surface 14 of the control television camera tube. The image of a point in the scene on surface 14 is therefore, out of focus, and without mask 10, the light intensity across the pattern caused by the defocusing is uniform, as shown in FIG. 3A. Mask 10 has a variable transmittance such that the light is not attenuated at the optical axis of the lens 12 but is attenuated by a monotonically increasing amount with increasing distance from the axis. The effect of the mask is to modify the uniform light intensity pattern of FIG. 3A, produced by a point in the scene, to form the non-uniform pattern of light intensity shown in FIG. 3B. By defocusing and appropriate design of the mask, the resultant pattern of FIG. 3B can be made to approximate a zeroth order modified Hankel function to an accuracy sufficient for practical operation of the system.

Figure 4:
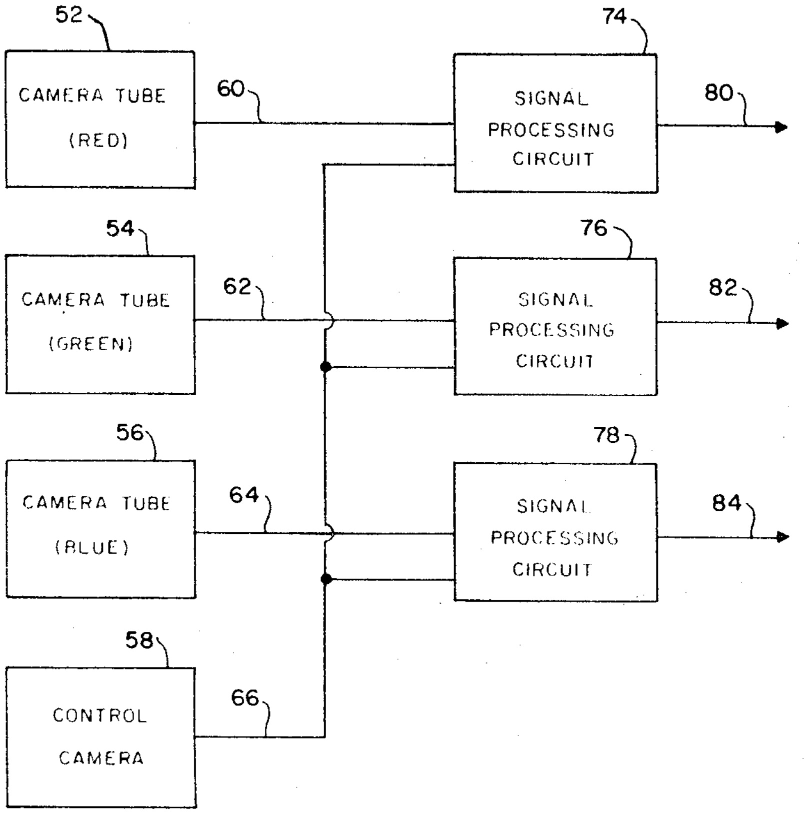
FIG. 4 is a block diagram of a gain control system used with a color television camera.

The image enhancement system can also be employed with a color television camera, such as in FIG. 4. The color camera includes three focused camera tubes 52, 54 and 56 which are spectrally filtered to detect the red, green and blue images, respectively, of a scene. The control camera 58 has no spectral filter and detects a spatially smoothed image of the luminance of the scene being viewed. A separate signal processing circuit is employed with each image tube of the color camera, with control camera 58 providing the control signal to all the processing circuits. As illustrated, signal processing circuits 74, 76 and 78 receive signals from respective tubes 52, 54 and 56, and from control camera 58. Each of the signal processing circuits operates in the same manner as described herein-before to produce a gain compensated video output signal. In the color television embodiment, three compensated output signs are produced, one for each primary color, which are subsequently employed to render the color image.

While what has been shown and described are now thought to be preferred embodiments of the invention, various alternatives and modifications will occur to those versed in the art. For example, the invention need not be limited to gain control of a television camera or to image tubes employing scanning, but can be employed in any system in which spatially smoothed information is available from which to derive a control signal, such as with photoelectric devices and matrices. Accordingly, the true scope of the invention is to be defined only in accordance with the following claims.

What is claimed is:

1. A system for automatically controlling the amplitude of an output signal from a focused television camera having a scanning beam, said system comprising:

first means for deriving a spatially smoothed image of the scene being viewed by said focused television camera;

second means for producing a control signal in response to the spatially smoothed image of the scene being viewed by said focused television camera, said second means having a beam which scans in synchronism with the beam of said focused television camera; and third means for applying said control signal to the focused television camera output signal to vary the amplitude of the output signal from said focused television camera at each instant during the scan as a function of the amplitude of said control signal at the same instant.

2. A system according to claim 1 in which said first means includes a control television camera scanned in synchronism with said focused camera.

3. A system according to claim 2 in which said first means further includes means for defocusing the image of said control television camera and a mask disposed in light transmitting relationship with said control camera and having maximum transmission at the optical axis and monotonically decreasing transmission with increasing radial distance from the optical axis.

4. A system according to claim 3 in which said third means comprises, first and second phase inverters each operative in response to signals from said respective focused and defocused camera to produce phase inverted versions thereof, first and second direct current restorers connected to the respective first and second phase inverters, a voltage divider connected between the outputs of said first and second restorers, and a transistor having its base connected to said voltage divider, its emitter connected to a source of reference potential, and its collector connected through a resistor to the output of said first restorer, and a third phase inverter having its input connected to the collector of said transistor, the output of said third inverter being the gain compensated video output signal.

5. A system according to claim 1 in which said focused camera is a color camera including three camera tubes operative to receive focused spectrally filtered images from a scene, and in which said first means is operative to receive luminance information, and said third means comprises three identical circuits operative in response to signals from said first means and respective camera tubes of said focused camera to produce respective control signals proportional to the spatially smoothed versions of the spectrally filtered images of a scene being viewed.

6. A system according to claim 2 in which said third means includes signal processing circuitry having a first input connected to said focused camera and a second input connected to said control camera, and operative in response to signals from said cameras to produce a signal which is proportional to the relation $F/(C+KF)$, where F and C are the signals of said focused and control cameras, respectively, and K is a constant.

References Cited

UNITED STATES PATENTS

| | | | |
|---|---|---|---|
| 2,901,539 | 8/1959 | Morgan | 178—7.2 |
| 3,090,281 | 5/1963 | Marechal et al. | 88—24 |

RICHARD MURRAY, Primary Examiner

R. LANGE, Assistant Examiner

U.S. Cl. X.R.

178—7.2